(12) United States Patent
Krause

(10) Patent No.: US 12,223,542 B1
(45) Date of Patent: Feb. 11, 2025

(54) BID SOLICITATION SYSTEM

(71) Applicant: Richard A. Krause, Arlington Heights, IL (US)

(72) Inventor: Richard A. Krause, Arlington Heights, IL (US)

(*) Notice: Subject to any disclaimer, the term of this patent is extended or adjusted under 35 U.S.C. 154(b) by 437 days.

(21) Appl. No.: 17/517,191

(22) Filed: Nov. 2, 2021

Related U.S. Application Data

(63) Continuation-in-part of application No. 17/508,277, filed on Oct. 22, 2021, now Pat. No. 12,118,631, and a continuation-in-part of application No. 17/492,246, filed on Oct. 1, 2021, and a continuation-in-part of application No. 17/133,714, filed on Dec. 24, 2020, now Pat. No. 11,321,791.

(60) Provisional application No. 63/108,478, filed on Nov. 2, 2020.

(51) Int. Cl.
*G06Q 30/08* (2012.01)
*G06Q 10/0631* (2023.01)

(52) U.S. Cl.
CPC ....... *G06Q 30/08* (2013.01); *G06Q 10/06313* (2013.01)

(58) Field of Classification Search
CPC ............. G06Q 30/08; G06Q 10/06313; G06Q 10/087; G06Q 50/08
USPC .......................................... 705/28, 300, 301
See application file for complete search history.

(56) References Cited

U.S. PATENT DOCUMENTS

| | | | | |
|---|---|---|---|---|
| 2004/0039681 A1* | 2/2004 | Cullen, III | ............. | G06Q 10/10 705/37 |
| 2006/0015475 A1* | 1/2006 | Birkner | .................. | G06Q 50/08 |
| 2010/0161495 A1* | 6/2010 | Olson | .................. | G06Q 50/165 705/400 |

* cited by examiner

*Primary Examiner* — Ariel J Yu
*Assistant Examiner* — Denisse Y Ortiz Roman
(74) *Attorney, Agent, or Firm* — Christopher J. Scott

(57) ABSTRACT

The Bid Solicitation System and Method according to the present invention solicits vendors involved with all aspects of construction materials, equipment, and services wishing to be alerted of construction projects of wide variety provided vendor capabilities meet certain parameters established by the Bid Solicitation System and Method. The vendor, after reviewing the detailed requirements including time of delivery or services, can choose whether it wishes to provide a bid to be considered. To be part of the process, the vendor is first required to fill out an extensive application and provide a reasonable amount of backup support documentation all of which is verified by the Bid Solicitation System and Method. The system then generates a Request for Bid and delivers the Request for Bid to applicable vendors that provide such item(s) to support a conventional or automated construction processes.

20 Claims, 1 Drawing Sheet

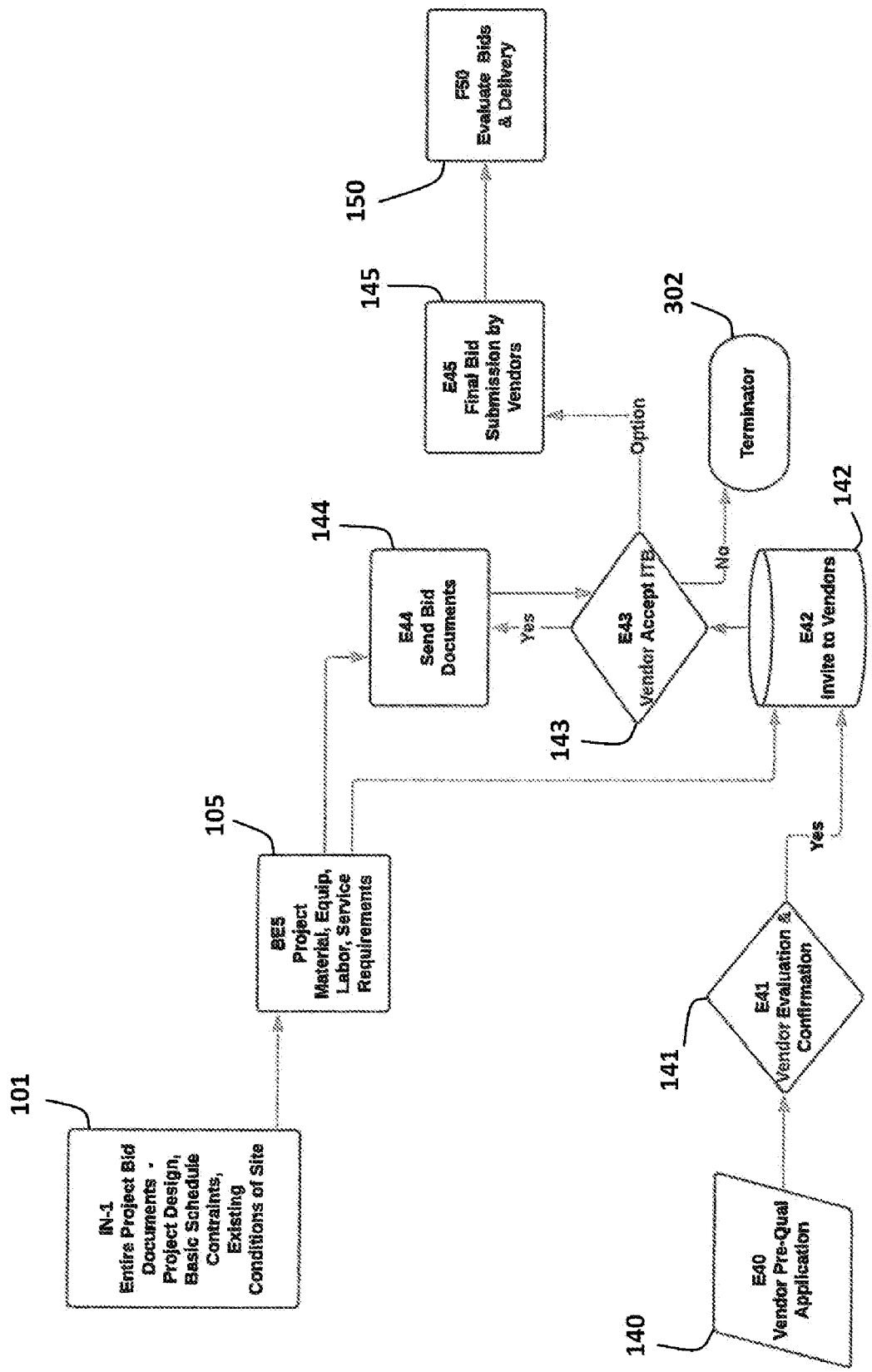

BID SOLICITATION SYSTEM

PRIOR HISTORY

This application claims the benefit of U.S. Provisional Patent Application No. 63/108,478 filed in the United States Patent and Trademark Office (USPTO) on 2 Nov. 2020; is a Continuation-in-Part application of pending U.S. patent application Ser. No. 17/133,714 filed in the USPTO on 24 Dec. 2020; is a Continuation-in-Part application of pending U.S. patent application Ser. No. 17/492,246 filed in the USPTO on 1 Oct. 2021; and is a Continuation-in-Part application of pending U.S. patent application Ser. No. 17/508,277 filed in the USPTO on 22 Oct. 2021 the specifications and drawings of which applications are hereby incorporated by reference thereto.

FIELD OF THE INVENTION

These specifications generally relate to a system for managing a construction project, and more particularly to a software or module-based system that pre-qualifies and creates a database of vendors for a wide variety of construction supplies and services. After being provided Project Design Data information the system has the intelligence to understand each individual material, equipment, accessory, and labor need. The system then generates a Request for Bid and delivers the Request for Bid to applicable vendors that provide such item(s) to support a conventional or automated construction processes.

BRIEF DESCRIPTION OF THE PRIOR ART

US Patent Application Publication No. 2020/0151937, authored by Miller ('937 Publication), discloses a Method and System for Construction Project Management Using Photo Imaging Measurements. The '937 Publication describes harnesses the use of photo imaging and measurement capture for use by do-it-yourselfers, handymen and small contractors. The method and system operates on mobile computing devices and includes an image recognition system. By performing various imaging-based measurements and then processing the resultant data, the method and system produces bills of materials, invoices, and receipts for the necessary tools and materials required by the construction project.

US Patent Application Publication No. 2020/0027043, authored by Agassi, et al. ('043 Publication), discloses a Construction Project Management System and Method Thereof. The '043 Publication describes a management system including processing circuitry and a memory, the memory containing instructions that, when executed by the processing circuitry, configure the system to: analyze a project data of a construction; based on the analysis of the project data, derive metadata associated with the construction project, wherein the metadata designates at least various stages associated with the construction project, and a completion threshold for each stage; and based on the metadata, generate an interface for allowing at least two end-user devices to collaboratively interact with the interface, wherein the interface provides interactive visual features indicative of a progress of each of the stages associated with the construction project.

US Patent Application Publication No. 2019/0003153, authored by Shike, et al. ('153 Publication), discloses a Construction Management System, Construction Management Method, and Management Device. The '153 Publication describes a management system including an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

US Patent Application Publication No. 2019/0026843, authored by Kim ('843 Publication), discloses a Method for Integrated Management Including Building Construction and Maintenance Based on Video. The '843 Publication describes a video-based integrated building construction and maintenance management method in which a series of processes of building construction and maintenance after build completion is produced as a video and registered in a building management server. The video is configured to be checked by a building owner or resident so that a building can be transparently managed by fundamentally preventing faulty construction that may occur during a construction step and untrustworthy maintenance.

US Patent Application Publication No. 2018/0332102, authored by Sheidaei ('102 Publication), discloses a Cloud-Based System for Collaborating Engineering, Operations, Maintenance, Project Management, Procurement, and Vendor Data and Activities. The '102 Publication describes certain systems and methods operable via a cloud platform utilizing Artificial Intelligence (AI). The system is configured to connect with a computerized application to store and manage data and activities of one or more departments.

The system enables vendors to access the data of one more departments to perform vendor activities such as generating quote documents. The system is further configured to provide a bid evaluation including a list of one or more vendor comprising products matching the requirements of the one or more departments. The system further enables personnel of one or more departments to select at least one vendor for placing orders and enables the selected vendor to submit data required by the personnel of one or more departments to collaborate data or for procurement.

US Patent Application Publication No. 2018/032225, authored by Schwartz ('225 Publication), discloses a System for On-Site Tracking, Managing, Planning and Staging Construction Projects. The '225 Publication describes a construction management system for allowing a user to capture an item identifier from an item (e.g., shipment, group of components, and/or one or more components) using a mobile device. The item identifier may be used to identify a project and access a model for the product, identify a component in a model, and/or identify the components in a shipment for staging purposes.

Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

US Patent Application Publication No. 2018/0209156, authored by Pettersson ('156 Publication), discloses a Construction Management System and Method. The '156 Publication describes a construction management system for constructing a building including at least one heavy lifting machine for moving a one building element to a mounting position on the building, a central computing unit providing a building information model comprising at least a construction plan comprising a target state of the building construction, a three-dimensional model of an actual construction state of the building, and a three-dimensional model of the element, wherein the central computing unit is adapted to determine the mounting position for the element based on the construction plan, the model of the current construction state and on the model of the element.

US Patent Application Publication No. 2018/0174250, authored by Faulkner ('250 Publication), discloses certain Construction Project Management Systems and Methods. The '250 Publication describes an operation including the steps of generating a project profile for a construction project, determining project details of the project, determining a regulatory process to be performed during the project based on the project details and regulatory rules, determining worker's certificates or licenses corresponding to the regulatory process and the project details, determining candidate workers for the construction project from registered workers, and causing a first GUI for selection of one or more candidate workers to be generated. The first GUI includes indicators of statuses of the worker's certificates or licenses corresponding to the regulatory process with respect to each of the one or more candidate workers.

US Patent Application Publication No. 2017/0278037, authored by Pettersson ('037 Publication), describes a Construction Management System and Method for Linking Data to a Building Information Model. The '037 Publication describes a construction management system comprising a plurality of sensor means adapted to detect events at a building site of the structure, a central computing unit providing a three-dimensional model of the building site, and at least one displaying device that is adapted to display the three-dimensional model to a user. The sensor means are adapted to generate data comprising information about a detected event.

The system further comprises communication units adapted to transmit a message comprising the data and a location information to the central computing unit, assign coordinates in the three-dimensional model according to the location information, evaluate options for reacting on the event by analyzing the data, assign evaluated options to the data, and display a note which is related to evaluated options to the user in real-time at the assigned coordinates in the three-dimensional model.

U.S. Pat. No. 10,831,944 ('944 Patent), issued to Giattina, discloses a System and Method to Facilitate the Design, Manufacturing and Construction of Structures. The '944 Patent describes a system that facilitates the building of a structure according to a project architectural design plan. The system provides standardized information to participants associated with a project based on the project design plan. The project architectural design plan can be compliant with one or more standards stored by the system. The project design plan can also incorporate information regarding products that are utilized in the project such as a plurality of prefabricated building modules. The requirements for a product are dictated by the standards established for the product and the project. Information about products used in the project can be embedded in links of the project architectural design plan.

U.S. Pat. No. 10,593,104 ('104 Patent), issued to Robert, et al., discloses certain Systems and Methods for Generating Time Discreet 3D Scenes. The '104 Patent describes certain methods, systems, and apparatus including medium-encoded computer program products for generating and visualizing 3D scenes of a build-site. The invention may be said to include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data. The methodology further reconstructs and outputs a series of three dimensional (3D) modeled scenes of the physical site from the site data using the imaging data, the coordinate data, and the time metadata.

Generally considering the state of the art exemplified by the patent publications briefly described above, the reader will bear in mind certain shortcomings in the construction industry at least insofar as its relatively low-level digitalization is concerned. In other words, the reader will note from a consideration of the foregoing that the state of construction industry art perceives a need for a digitalized comprehensive construction project management system that receives design component data from an outside design provider, converts the design component data into a standardized format for use by a plurality of interconnected system-supportive, software-based module components to advance the initial design component data from design concept to final build all within a system of full or near-full automation. What follows is a summary of a first non-transitory, computer-implementable software-based application or module component supportive of a comprehensive construction project management system otherwise described more fully in U.S. patent application Ser. No. 17/133,714 ('714 Application), from which this application claims a benefit and builds thereupon.

SYSTEM BACKGROUND AND SUMMARY

In the world's pursuit to automate construction there is a need to develop a more comprehensive and expeditious way to access pricing from vendors that are confirmed for having the expertise and capability to provide materials and/or services, in a timely manner, for a construction project that goes beyond what exists in the market today. A vendor/bid solicitation system is needed that can take information provided from the electronic design along with basic schedule constraint information fed into it then read and decipher it down to the smallest details from large components and equipment to the smallest connection materials such as closure trim, screws, nails, adhesives, etc. Then in a short amount of time, in an AI, automated manner, sort and solicit the group of vendors that have the capability of meeting all the project requirements including quality, scheduled delivery, performance requirements, etc. The AUTOBUILD Bid Solicitation System according to the present invention meets these objectives.

The working parts of the AUTOBUILD Bid Solicitation System, in concert with related elements within these specifications together cooperate with one another to generally vet and correct a project design to ensure its competency down to the most minor details. This is necessary in the modern world simply to avoid the number of errors and delays that take place on a construction site. Vetting and/or correcting project designs is a critical aspect of the AUTOBUILD Bid Solicitation System to provide precise and accurate information and direction to enable computers, robots, drones, etc. (i.e., non-human participants) to carry out a project design in an automated manner.

The AUTOBUILD Bid Solicitation System vets at least the following: design intent; compatibility of materials and their connections to other materials; material strengths; structural integrity; moisture contents; colors; precise locations in the intended three-dimensional envelope, etc. The AUTOBUILD Bid Solicitation System very basically ensures the project design and information provided in support thereof are competent, compatible, and comprehensive toward the intended design.

The AUTOBUILD Bid Solicitation System according to the present invention solicits vendors involved with all aspects of construction materials, equipment, and services wishing to be alerted of construction projects of wide variety provided vendor capabilities meet certain parameters established by the AUTOBUILD Bid Solicitation System. The vendor, after reviewing the detailed requirements including time of delivery or services, can choose whether it wishes to provide a bid to be considered. To be part of the process, the vendor is first required to fill out an extensive application and provide a reasonable amount of backup support documentation all of which is verified by the AUTOBUILD Bid Solicitation System.

The information required comprises financial statements, bank verifications, number of employees, listing of relevant equipment owned, operation of business, business location, facility size, operational logistics, customer references, performance history, etc. The AUTOBUILD Bid Solicitation System and Method contains a built-in matrix for evaluating the capability of the vendor "Vendor Capability Evaluation" to meet the requirements of the project based on all the information provided. It should be pointed out briefly here that some of the evaluation criteria is communicated in the form of a rating system, when a vendor provides a bid, to be identified and considered in the bid evaluation process later down the line.

When the "Vendor Capability Evaluation" is completed and is filed into the AUTOBUILD Bid Solicitation System and Method Database, the Database then becomes the resource to be tapped into when the individual elements of a construction project have enquired to receive quotes needed to fulfill the total cost evaluation of a project and find an entity that can carry out the work required in a competent, reliable manner.

When a project is put out to bid by an owner, manager, or contractor by way of the AUTOBUILD Bid Solicitation System and Method, the project data is entered into the system in a format that is compatible with the AUTOBUILD Bid Solicitation System and Method. The AUTOBUILD Bid Solicitation System and Method then takes this project data and with its intelligence matches up the required materials, equipment, labor, and other construction services to the appropriate vendors within its database.

A solicitation notice is then sent to those appropriate vendors for their decision on whether to bid on the project or not. If the vendor chooses to bid the project, the AUTOBUILD Bid Solicitation System and Method then helps facilitate the delivery of the fully detailed construction project documents in order for the vendor to develop its comprehensive bid proposal that meets all of the project requirements.

Once the vendor develops its comprehensive bid proposal for the project, the AUTOBUILD Bid Solicitation System and Method assists in the assuring that the bid proposal is being sent with all required information, pricing, and in a format that is compatible to any bid evaluation process that is currently in the market or in development. As stated previously, this is the stage in which some of the pertinent "Vendor Capability Evaluation" information would be provided to be considered in the final evaluation of bids for a project.

The bid solicitation system according to the present invention is contemplated to essentially provide a bid solicitation system operable within a construction project management system. The bid solicitation system is contemplated to preferably comprise, in combination: a series of networked computers, the series of networked computers being in communication with one another and being configured to implement a series of non-transitory, computer-implementable, software-based modular components allowing directional inter-module communication therebetween.

The series of computer-implementable, software-based modular components preferably comprise in combination: a project design, basic schedule constraints, and existing conditions of site software module component; a centralized project material, equipment, labor, service requirements software module component; and at least one downstream software module component. The project design, basic schedule constraints, and existing conditions of site software module component essentially provides information concerning a design project to be added to the system for enabling said system to perform its function in soliciting bids required for the design project.

The centralized project material, equipment, labor, service requirements software module component is in downflow communication with the project design, basic schedule constraints, and existing conditions of site software module component. The centralized project material, equipment, labor, service requirements software module accumulates information received from the project design, basic schedule constraints, and existing conditions of site software module component; analyzes the information; labels the information and organizes the information in a manner for enabling and supporting peripheral software module components in networked, inter-module communication with the project material, equipment, labor, service requirements software module to perform peripheral software module component functions.

The at least one downstream software module component receives data from the centralized project material, equipment, labor, service requirements software module component and is configured to solicit vendors involved with all aspects of construction materials, equipment, and services wishing to be alerted the design project. Notably, the vendors are preferably first vetted before being solicited by the at least one downstream software module component.

The vendors are vetted by at least one prequalification software module component, which prequalification software module component provides a portal for vendors to obtain pre-qualifications to participate in the design project. The vendors are then preferably rated based on vendor information provided to the prequalification software module component. The vendors are rated by a vendor evaluation and confirmation software module component in downflow communication with the vendor prequalification software module component.

The bid solicitation system further preferably comprises an invite to vendors software module component. The invite to vendors software module component is in downflow communication with the vendor evaluation and confirmation software module component and the centralized project material, equipment, labor, service requirements software module component for (a) interpreting information concerning products and quantities needed for the project along with schedule and sequence information sent to it from centralized project material, equipment, labor, service requirements software module component and (b) receiving and storing a vendor rating to be utilized as a resource within the bid solicitation system.

The bid solicitation system further preferably comprises a vendor invitation to bid acceptance software module component. The vendor invitation to bid acceptance software module component is preferably configured to query whether vendor invitations are accepted. Accepted invitations to bid initiate a transfer of information of detailed bid documents from a send final and complete bid documents software module component. Declined invitations to bid operate to eliminate vendors from the system. The send final and complete bid documents software module component is in downflow communication with the centralized project material, equipment, labor, service requirements software module component and in bidirectional communication with the vendor invitation to bid acceptance software module component.

The bid solicitation system further preferably comprises a final bid submission by vendors software module component. The final bid submission by vendors software module component is in downflow communication with the vendor invitation to bid acceptance software module component for allowing vendors to transmit final bid submissions. The final bid submissions are required to confirm vendor commitments for timely competition of vendor contributions to the design project. The bid solicitation system may further preferably comprise an evaluation of bids and project delivery time software module component.

The evaluation of bids and project delivery time software module component being in downflow communication with the final bid submission by vendors software module component for compiling all information and evaluating a lowest responsible bidder who can also meet the scheduled time of completion for a respective line item of the lowest responsible bidder. The evaluation of bids and project delivery time software module component ranks bids and provides a listing of criteria with exemplary indicators for each bidder.

BRIEF DESCRIPTIONS OF THE DRAWINGS

Other features and objectives of the present invention will become more evident from a consideration of the following brief description of the patent drawing submitted in support of these specifications.

FIG. 1 is a flowchart diagram depicting a centralized or hub-like Project Material, Equipment, Labor, Service Requirements software module component in downflow communication from a singular Project Design, Basic Schedule Constraints, and Existing Conditions of Site software module component with a first series of branching software module components or nodes in downflow communication from the Project Material, Equipment, Labor, Service Requirements software module component.

DETAILED DESCRIPTION OF THE PREFERRED EMBODIMENT

A software program may comprise numerous modules as separate executable files that form parts of a whole program. A module is a software component or part of a program that contains one or more routines. One or more independently developed modules make up a program. An enterprise-level software application may contain several different modules. and each module serves unique and separate business operations. Given the complexity of the overall operating system, the author has selected the term module to describe the software module components that together cooperate to provide or support the Comprehensive Construction Project Management System of U.S. patent application Ser. No. 17/133,714 ('714 Application) from which this application claims a benefit and is a Continuation-in-Part Application.

The reader is firstly directed to the IN-1 Entire Bid Documents—Project Design, Basic Schedule Constraints, and Existing Conditions of Site Node (101) or IN-1 Node (101). The IN-1 Node (101) encompasses incoming information concerning the project required to be added for the AUTOBUILD Bid Solicitation System and Method to perform its function in soliciting bids required for the project. This IN-1 Node (101) is not part of the present invention, but is available in the current market, and required for the AUTOBUILD Bid Solicitation System and Method to operate.

In downflow communication with the IN-1 Node (101) is the BE5 Project Material, Equipment, Labor, Service Requirements Node (105) or BE5 Node (105). The BE5 Node (105) accumulates the information inputted into it as it relates to the Entire Bid Documents-Project Design, Basic Schedule Constraints, and Existing Conditions of Site Node (101). The BE5 Node (105) breaks down, labels and organizes this information in a manner that can be sent to downstream to the E42 Invite to Vendors Node (142), and matched up with the vendor pool contained in the E42 Node (142). This organization is also used by the downstream E44 Send Bid Documents Node (144) to help send out bid packages in a sorted manner.

The E40 Node (140) is a Vendor (Subcontractor and Supplier) Prequalification Application Node. The E40 Node (140) is the portal for all Vendors (Subcontractors & Suppliers) wishing to be part of and utilized within the AUTOBUILD Bid Solicitation system/platform. Vendors are required by the AUTOBUILD Bid Solicitation system/platform to provide a substantial amount of information to be prequalified and considered a resource to the AUTOBUILD Bid Solicitation system/platform. The types of information required of Vendors include, but not necessarily be limited to, information pertaining to the products they provide/manufacture; the number of employees, financial strength, financial statements, production capability, raw material access, delivery capability, past performance, etc.

The E41 Node (141) is a Vendor (Subcontractor and Supplier) Evaluation-Confirmation-Approval Node in downflow communication with the E40 Node (140). The E41 Node (141) evaluates information received from the E40 Node (140) and rates each vendor based on the information provided such as products provided, number of employees, financial strength, financial statements, production capability, raw material access, delivery capability, and past performance as prefaced above. After a thorough investigation and evaluation, a comprehensive rating is sent to the E42 Invite to Vendors (Subcontractor and Supplier) Node (142) in downflow communication with the E41 Node (141) to be stored in a database made part of the E42 Node (142) and utilized as a resource for the AUTOBUILD Bid Solicitation system/platform according to the present invention.

The E42 Invite to Vendors (Subcontractor and Supplier) Node (142) is an Invitation to Prequalified Subcontractors & Suppliers Node in downflow communication with the E41 Node (141) as well as the BE5 Node (105). The E42 Node (142) interprets information sent to it from the BE5 Node (105) concerning products and quantities needed for the project along with schedule and sequence information. The information received is compared against the information stored in the database for subcontractors and suppliers to utilize and to whom bid solicitations may then be sent as at envelope as depicted by the E43 Node (143) and described as a Vendor Invitation to Bid Acceptance Node in downflow communication with the E42 Node (142).

The bid invite/solicitations sent out by the E42 Node (142) contain initial information concerning product specifications along with associated quantities needed for the project and further sets forth preferred/required dates for product delivery and/or installation scheduling as governed by the BE5 Node (105). This process allows the vendor to decide on whether to respond to the invitation to bid. The information format sent by the E42 Node (142) allows vendors to interpret and assess either manually by a human operator or by way of an automated system with a subsequent response or answer to the invitation communicated back into the automated language of the AUTOBUILD Bid Solicitation system/platform.

As prefaced above, the E43 Node (143) is a Vendor Invitation to Bid Acceptance query type Node in downflow communication with the E42 Node (142). The E43 Node (143) is simplistic in design and manages those vendors indicating an interest in the project and indicating a commitment to respond to the invitation to bid. Once a vendor accepts the Invitation to Bid or ITB, the E43 Node (143) initiates a further transmission of the balance of detailed bid document information to responding vendor. Non-accepting vendors are eliminated from the system as at end/terminate element (302).

The E44 Node (144) is a Send Final and Complete Bid Documents Node. The E44 Node (144) is a secondary brain according the present invention that assembles or compiles all final information concerning details of scope of work and required performance time and transmits this compiled information to all vendors that have accepted the bid invitation. The bid documents sent out by the E44 Node (144) comprise final detailed information concerning product specifications along with their associated quantities needed for the project and sets forth required dates for delivery and installation scheduling governed by the BE5 Node (105).

The information formatting sent by the E44 Node (144) allows vendors to interpret and assess either manually by way of a human operator or by way of the automated language of the AUTOBUILD Bid Solicitation system/platform. The vendors are provided with AUTOBUILD Bid Solicitation system formats that the vendors can input in their own respective customized response data centers with parameters in order to automate vendor pricing for the line items in bidding and for confirmations that the individual vendors can meet the required completion time on the project.

The E45 Node (145) is a Final Bid Submission by Vendors Node. The E45 Node (145) allows a vendor to transmit its bid response which can be done manually if it conforms to the AUTOBUILD Bid Solicitation input system or in an automated manner that is communicated through the format provided by the AUTOBUILD Bid Solicitation system/platform. A final bid submission is required by the vendor(s) and managed by this node to confirm the vendor commitment(s) to meet the delivery date for its portion of the project.

The reader will note that the E45 Node (145), to a small extent, lies outside of the central AUTOBUILD Bid Solicitation system/platform as it can be controlled by the vendor with its own response data and parameters. This node information can then be used in the F50 Evaluate Bids & Delivery Node (150) in downflow communication with the E45 Node (145) to be evaluated. When approved the vendor is notified and contracted to begin to manufacture, deliver, and or build its line item of the project.

The F50 Node (150) is an Evaluation of Bids and Project Delivery Time Node is not part of the present invention and is done manually with experienced humans but is also available in the current market in partial forms. This F50 Node (150) gathers all information, contract requirements, and bids received, and evaluates, in a chronological order, the lowest responsible bidder that can also meet the scheduled time of completion for its line item. For each line item, this node ranks in order of the best bid received and provides a listing of criteria with exemplary indicators (e.g. plusses and minuses) for each bidder in a sequential manner as it goes down the listing of criteria.

While the above descriptions contain much specificity, this specificity should not be construed as limitations on the scope of the invention, but rather as an exemplification of the invention. The foregoing specifications are contemplated to essentially provide a bid solicitation system operable within a construction project management system. The bid solicitation system is contemplated to preferably comprise, in combination: a series of networked computers, the series of networked computers being in communication with one another and being configured to implement a series of non-transitory, computer-implementable, software-based modular components allowing directional inter-module communication therebetween.

The series of computer-implementable, software-based modular components preferably comprise in combination: a project design, basic schedule constraints, and existing conditions of site software module component; a centralized project material, equipment, labor, service requirements software module component; and at least one downstream software module component. The project design, basic schedule constraints, and existing conditions of site software module component essentially provides information concerning a design project to be added to the system for enabling said system to perform its function in soliciting bids required for the design project.

The centralized project material, equipment, labor, service requirements software module component is in downflow communication with the project design, basic schedule constraints, and existing conditions of site software module component. The centralized project material, equipment, labor, service requirements software module accumulates information received from the project design, basic schedule constraints, and existing conditions of site software module component; analyzes the information; labels the information and organizes the information in a manner for enabling and supporting peripheral software module components in networked, inter-module communication with the project material, equipment, labor, service requirements software module to perform peripheral software module component functions.

The at least one downstream software module component receives data from the centralized project material, equipment, labor, service requirements software module component and is configured to solicit vendors involved with all aspects of construction materials, equipment, and services wishing to be alerted the design project. Notably, the vendors are preferably first vetted before being solicited by the at least one downstream software module component.

The vendors are vetted by at least one prequalification software module component, which prequalification software module component provides a portal for vendors to obtain pre-qualifications to participate in the design project. The vendors are then preferably rated based on vendor information provided to the prequalification software module component. The vendors are rated by a vendor evaluation and confirmation software module component in downflow communication with the vendor prequalification software module component.

The bid solicitation system further preferably comprises an invite to vendors software module component. The invite to vendors software module component is in downflow communication with the vendor evaluation and confirmation software module component and the centralized project material, equipment, labor, service requirements software module component for (a) interpreting information concerning products and quantities needed for the project along with schedule and sequence information sent to it from centralized project material, equipment, labor, service requirements software module component and (b) receiving and storing a vendor rating to be utilized as a resource within the bid solicitation system.

The bid solicitation system further preferably comprises a vendor invitation to bid acceptance software module component. The vendor invitation to bid acceptance software module component is preferably configured to query whether vendor invitations are accepted. Accepted invitations to bid initiate a transfer of information of detailed bid documents from a send final and complete bid documents software module component.

Declined invitations to bid operate to eliminate vendors from the system. The send final and complete bid documents software module component is in downflow communication with the centralized project material, equipment, labor, service requirements software module component and in bidirectional communication with the vendor invitation to bid acceptance software module component.

The bid solicitation system further preferably comprises a final bid submission by vendors software module component. The final bid submission by vendors software module component is in downflow communication with the vendor invitation to bid acceptance software module component for allowing vendors to transmit final bid submissions. The final bid submissions are required to confirm vendor commitments for timely competition of vendor contributions to the design project. The bid solicitation system may further preferably comprise an evaluation of bids and project delivery time software module component.

The evaluation of bids and project delivery time software module component being in downflow communication with the final bid submission by vendors software module component for compiling all information and evaluating a lowest responsible bidder who can also meet the scheduled time of completion for a respective line item of the lowest responsible bidder. The evaluation of bids and project delivery time software module component ranks bids and provides a listing of criteria with exemplary indicators for each bidder.

Accordingly, although the bid solicitation system according to the present invention has been described by reference to a number of different features and aspects, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A bid solicitation system comprising, in combination:
a plurality of networked computers being in communication with one another and configured to implement a plurality of non-transitory, computer-implementable, software-based components allowing inter-component communication therebetween;
a project design, basic schedule constraints, and existing conditions of site software component configured to provide information concerning a project design for enabling said bid solicitation system to perform its function in soliciting bids required for a construction of a project from the project design; and
a centralized project material, equipment, labor, service requirements software component configured to:
receive said information from the project design, basic schedule constraints, and existing conditions of site software component;
accumulate said information received from the project design, basic schedule constraints, and existing conditions of site software component;
analyze said information for errors to properly enable and support downstream automation processes to support a complete construction of the project design in an automated manner;
alert a user if corrections are required for supporting the project design and the complete construction thereof;
convert said information into a standardized data format that enables peripheral software components in networked, inter-component communication with the centralized project material, equipment, labor, service requirements software component to perform automated peripheral software component functions;
label and organize said information in a manner for enabling and supporting peripheral software components in networked, inter-component communication with the project material, equipment, labor, service requirements software component to perform peripheral software component functions;
send said information as labeled and organized to at least one downstream software component configured to:
receive said information from the centralized project material, equipment, labor, service requirements software component; and
solicit vendors involved with all aspects of construction materials, equipment, and services wishing to be alerted in connection with the construction of the project.

2. The bid solicitation system of claim 1 wherein the vendors are vetted before being solicited by the at least one downstream software component.

3. The bid solicitation system of claim 2 wherein the vendors are vetted by at least one prequalification software component configured to provide a portal for the vendors to obtain prequalification to participate in the project design and construction thereof.

4. The bid solicitation system of claim 3 wherein the vendors are rated based on vendor information provided to the prequalification software component, the vendors being rated by a vendor evaluation and confirmation software component in communication with the vendor prequalification software component.

5. The bid solicitation system of claim 4 comprising an invite to vendors software component in communication with the vendor evaluation and confirmation software component and the centralized project material, equipment, labor, service requirements software component configured to (a) interpret information concerning products and quantities needed to construct the project along with schedule and sequence information sent thereto from the centralized project material, equipment, labor, service requirements software component and (b) receive and store a vendor rating to be utilized as a resource.

6. The bid solicitation system of claim 5 comprising a vendor invitation to bid acceptance software component configured to query whether vendor invitations are accepted, whereby accepted invitations to bid initiate a transfer of information of detailed bid documents from a send final and complete bid documents software component, and whereby declined invitations to bid operate to eliminate vendors from said bid solicitation system.

7. The bid solicitation system of claim 6 wherein the send final and complete bid documents software component is in communication with the centralized project material, equipment, labor, service requirements software component and the vendor invitation to bid acceptance software component, the send final and complete bid documents software component being configured to send the detailed bid documents, including detailed quantity of material and equipment details, to accepted vendors to compile pricing in an automated manner, the detailed bid documents comprising detailed information concerning product specifications along with associated quantities needed for the project and setting forth required dates for delivery and installation scheduling as governed by the centralized project material, equipment, labor, service requirements software component.

8. The bid solicitation system of claim 6 comprising a final bid submission by vendors software component in communication with the vendor invitation to bid acceptance software component for allowing vendors to transmit final bid submissions, the final bid submissions being required to confirm vendor commitments for timely competition of vendor contributions to the project design.

9. The bid solicitation system of claim 8 comprising an evaluation of bids and project delivery time software component in communication with the final bid submission by vendors software component configured to:
compile all information and evaluate a lowest responsible bidder who can also meet the scheduled time of completion for a respective line item of the lowest responsible bidder; and
initiate and complete a legal contracting process with the lowest responsible bidder in an automated manner.

10. The bid solicitation system of claim 9 wherein the evaluation of bids and project delivery time software component is configured to rank bids and provide a listing of criteria with exemplary indicators for each bidder.

11. A bid solicitation system operable within a computer network environment configured to implement a plurality of non-transitory, computer-implementable, software-based components allowing inter-component communication therebetween, the bid solicitation system comprising, in combination:
at least one computer for implementing the plurality of non-transitory, computer-implementable, software-based components;
a project design, basic schedule constraints, and existing conditions of site software component configured to provide information concerning a project design for enabling the bid solicitations to perform its function in soliciting bids required for a construction of a project from the project design; and
a centralized project material, equipment, labor, service requirements software component configured to:
receive said information from the project design, basic schedule constraints, and existing conditions of site software component;
accumulate said information received from the project design, basic schedule constraints, and existing conditions of site software component;
analyze said information for errors to properly enable and support downstream automation processes to support a complete construction of the project design in an automated manner;
alert a user if corrections are required for supporting the project design and the complete construction thereof;
convert said information into a standardized data format that enables peripheral software components in networked, inter-component communication with the centralized project material, equipment, labor, service requirements software component to perform automated peripheral software component functions;
label and organize said information in a manner for enabling and supporting peripheral software components in networked, inter-component communication with the project material, equipment, labor, service requirements software component to perform peripheral software component functions;
send said information as labeled and organized to at least one downstream software component configured to:
receive said information from the centralized project material, equipment, labor, service requirements software component; and
solicit vendors involved with all aspects of construction materials, equipment, and services wishing to be alerted in connection with the construction of the project.

12. The bid solicitation system of claim 11 wherein the vendors are vetted before being solicited by the at least one downstream software component.

13. The bid solicitation system of claim 12 wherein the vendors are vetted by at least one prequalification software component configured to provide a portal for the vendors to obtain prequalification to participate in the project design and construction thereof.

14. The bid solicitation system of claim 13 wherein the vendors are rated based on vendor information provided to the prequalification software component, the vendors being rated by a vendor evaluation and confirmation software component, the vendor evaluation and confirmation software component being in communication with the vendor prequalification software component.

15. The bid solicitation system of claim 14 comprising an invite to vendors software component in communication with the vendor evaluation and confirmation software component and the centralized project material, equipment, labor, service requirements software component configured to (a) interpret information concerning products and quantities needed to construct the project the project along with schedule and sequence information sent thereto from the centralized project material, equipment, labor, service requirements software component and (b) receive and store a vendor rating to be utilized as a resource.

16. The bid solicitation system of claim 15 comprising a vendor invitation to bid acceptance software component configured to query whether vendor invitations are accepted, whereby accepted invitations to bid initiate a transfer of information of detailed bid documents from a send final and complete bid documents software component, and whereby declined invitations to bid operate to eliminate vendors from said bid solicitation system.

17. The bid solicitation system of claim 16 wherein the send final and complete bid documents software component is in communication with the centralized project material, equipment, labor, service requirements software component and the vendor invitation to bid acceptance software component, the send final and complete bid documents software component being configured to send the detailed bid documents, including detailed quantity of material and equipment details, to accepted vendors to compile pricing in an automated manner, the detailed bid documents comprising detailed information concerning product specifications along with associated quantities needed for the project and setting forth required dates for delivery and installation scheduling as governed by the centralized project material, equipment, labor, service requirements software component.

18. The bid solicitation system of claim 16 comprising a final bid submission by vendors software component in communication with the vendor invitation to bid acceptance software component for allowing vendors to transmit final bid submissions, the final bid submissions being required to confirm vendor commitments for timely competition of vendor contributions to the project design.

19. The bid solicitation system of claim 18 comprising an evaluation of bids and project delivery time software component in communication with the final bid submission by vendors software component configured to:

compile all information and evaluate a lowest responsible bidder who can also meet the scheduled time of completion for a respective line item of the lowest responsible bidder; and initiate and complete a legal contracting process with the lowest responsible bidder in an automated manner.

20. The bid solicitation system of claim 19 wherein the evaluation of bids and project delivery time software component is configured to rank bids and provide a listing of criteria with exemplary indicators for each bidder.

\* \* \* \* \*